(12) United States Patent
Baekelandt et al.

(10) Patent No.: US 8,336,284 B2
(45) Date of Patent: Dec. 25, 2012

(54) STEEL CORD COMPRISING A HEAT-CURABLE ONE-COMPONENT THERMOSETTING MATERIAL

(75) Inventors: Tom Baekelandt, Dadizele (BE); Hendrik Rommel, Sint-Michiels (BE)

(73) Assignee: NV Bekaert SA, Zwevegem (BE)

( * ) Notice: Subject to any disclaimer, the term of this patent is extended or adjusted under 35 U.S.C. 154(b) by 223 days.

(21) Appl. No.: 12/747,783

(22) PCT Filed: Dec. 15, 2008

(86) PCT No.: PCT/EP2008/067516
§ 371 (c)(1),
(2), (4) Date: Jun. 11, 2010

(87) PCT Pub. No.: WO2009/080583
PCT Pub. Date: Jul. 2, 2009

(65) Prior Publication Data
US 2010/0257834 A1   Oct. 14, 2010

(30) Foreign Application Priority Data
Dec. 21, 2007   (EP) .................................... 07124038

(51) Int. Cl.
*D02G 3/48* (2006.01)
(52) U.S. Cl. ......................................................... 57/241
(58) Field of Classification Search ................... 57/210, 57/211, 212, 218, 223, 232, 237, 241, 258
See application file for complete search history.

(56) References Cited

U.S. PATENT DOCUMENTS

| | | | | |
|---|---|---|---|---|
| 3,681,911 A * | 8/1972 | Humphries | ...................... | 57/217 |
| 3,800,522 A * | 4/1974 | Hughes et al. | .................. | 57/215 |
| 4,095,404 A * | 6/1978 | Babayan | .......................... | 57/297 |
| 4,197,695 A * | 4/1980 | Hughes et al. | ...................... | 57/7 |
| 4,645,718 A * | 2/1987 | Dambre | ......................... | 428/625 |
| 5,574,123 A * | 11/1996 | Bock et al. | ...................... | 528/45 |
| 2002/0189227 A1 | 12/2002 | Roux et al. | | |
| 2009/0101266 A1 | 4/2009 | Barguet et al. | | |

FOREIGN PATENT DOCUMENTS

| | | |
|---|---|---|
| EP | 0 530 445 A | 3/1993 |
| EP | 1 258 558 B1 | 11/2002 |
| FR | 2 873 721 A1 | 2/2006 |
| GB | 1100686 A | 1/1968 |
| NL | 6 412 585 A | 5/1965 |
| WO | WO 03/031716 A1 | 4/2003 |
| WO | WO 2007/020156 A | 2/2007 |

* cited by examiner

*Primary Examiner* — Shaun R Hurley
(74) *Attorney, Agent, or Firm* — Foley & Lardner LLP

(57) ABSTRACT

The present invention is related a steel cord (500, 600) comprising one or more strands (504, 602), said strands comprising at least two filaments, wherein the void spaces between at least two filaments of at least one of said one or more strands are at least partially filled with a composition comprising a thermosetting material (506, 606), characterized in that the thermosetting material (506, 606) is a heat-curable one-component thermosetting material. Further, the invention relates to a steel cord (100, 200, 300) comprising at least two strands (102, 104, 202, 204, 302, 304), said strands comprising at least two filaments, wherein the void spaces between at least two strands are at least partially filled with a composition comprising a thermosetting material (106, 206, 306), characterized in that the thermosetting material (106, 206, 306) is a heat-curable one-component thermosetting material.

27 Claims, 4 Drawing Sheets

STEEL CORD COMPRISING A HEAT-CURABLE ONE-COMPONENT THERMOSETTING MATERIAL

FIELD OF THE INVENTION

The present invention relates to the field of elastomer filled steel cords, more particularly to the field of steel cords that are used in dynamic applications such as in drive systems (window elevators in a car door, sliding doors, garage door openers, elevators and the like) as well as in steel cords as used for the reinforcement of elastomer products such as tires, timing belts, elevator belts hoses, conveyor belts and similar products.

BACKGROUND OF THE INVENTION

Steel cords (in what follows 'cord' will be used as synonym for 'rope' or 'cable'), used for example in timing belts, elevator belts, etc., normally work in tension and are subjected to bending under loads. The characteristics of particular importance required for such cables are strength, excellent fatigue properties, uniform permanent elongation and improved adhesion.

Such steel cords are sometimes interiorly provided with an elastomer filler, because it is well known in the state of the art that elastomer filled steel cord have properties superior to those of equal size bare steel cord. These improved properties are derived from the separation of the core strand from the outer strands and the outer strands from each other by the elastomer filler. Suitable thermoplastics include polypropylene, polyurethane, polyethylene, poly-amide, poly-tetrafluorethylene or polyvinylchloride. Also used are elastomers such as butyl or nitrile rubber. The elastomer filler reduces or eliminates the core to strand and strand to strand contact and abrasion when the steel cord is in service.

A method for filling a steel cord is described in for example EP 0530445, where poly-butadiene is extruded on the filaments or strands of a steel cord and cured. Such a process is not applicable when the necessary feed rate of the components drops below 5 to 10 ml/min. For example steel cords comprising filaments below about 0.30 mm can not longer be coated by means of such a system. Furthermore, extrusion is an expensive technique.

Another method is described in US patent application 2002/0189227, wherein a cable is produced by depositing the polymer material over the core and/or strands with an injection head a certain distance upstream of the cabling point and wherein in the injection head a pre-polymer and a polymerization accelerator are mixed and immediately deposited. However this process is suffering from uncontrolled curing, since upon depositing, the polymer material is already curing.

Another method of filling a steel cord is described in WO2007/020156, wherein the steel cord is dipped in an aqueous microemulsion containing polymers, followed by heating. A disadvantage of this method is that possibly remaining water may cause corrosion.

SUMMARY OF THE INVENTION

Given the drawbacks of prior art, it is a first object of the present invention to provide a steel cord having high strength, superior fatigue, elongation and adhesion properties.

Further it is an object the present invention to provide a steel cord having the advantageous property that its structural elongation is lower compared to its non-elastomer filled counterpart.

It is in particular an object of the present invention to provide a steel cord having the property that it shows less tension relaxation during use.

Further it is an object of the present invention to provide an effective and efficient method for manufacturing elastomer filled steel cord, which avoids the complexity of the expensive extrusion processes as described in the prior art.

It is further a particular object of the present invention to provide a method for manufacturing elastomer filled steel cord, wherein the point in time at which the curing of the elastomer occurs can be delayed at will. Consequently, the method allows to manipulate the elastomer filled steel cord and to use it as an intermediate product for further assembly to a final product, during which the elastomer is subjected to a curing step.

In addition, it is an object of the present invention to provide a method which may still be used for manufacturing elastomer filled steel cords with diameters below 0.30 mm.

In a first embodiment according to the present invention, a steel cord is provided comprising one or more strands, said strands comprising at least two filaments, wherein the void spaces between at least two filaments of at least one of said one or more strands are at least partially filled with a composition comprising a thermosetting material, characterized in that the thermosetting material is a heat-curable one-component thermosetting material.

In a second embodiment according to the present invention, a steel cord is provided comprising at least two strands, said strands comprising at least two filaments, wherein the void spaces between at least two strands are at least partially filled with a composition comprising a thermosetting material, characterized in that the thermosetting material is a heat-curable one-component thermosetting material.

In an embodiment in accordance with the present invention, the heat-curable one-component thermosetting material may comprise polyurethane.

In a preferred embodiment, the heat-curable one-component thermosetting material may comprise blocked isocyanate.

In another embodiment, the heat-curable one-component thermosetting material may comprise polyurethane and blocked isocyanate.

In an embodiment according to the present invention, the steel cord may comprise at least two strands, wherein the inter-strand and/or intra-strand void spaces may be at least partially filled with a composition comprising a heat-curable one-component thermosetting material.

In another embodiment according to the present invention, a steel cord is provided wherein the intra-strand void spaces may be filled for at least 80% with a composition comprising a heat-curable one-component thermosetting material.

In another embodiment according to the present invention, a steel cord is provided wherein the inter-strand void spaces may be filled for at least 80% with a composition comprising a heat-curable one-component thermosetting material.

In a preferred embodiment in accordance with the present invention, a steel cord is provided wherein both the intra-strand and inter-strand void spaces may be filled for at least 80% with a composition comprising a heat-curable one-component thermosetting material.

In a further embodiment in accordance with the present invention, the filaments or strands may be primed with an adhesion promoter.

In another further embodiment in accordance with the present invention, a steel cord is provided wherein the heat-curable one-component thermosetting material is cured.

In a specific embodiment according to the present invention, the steel cord may comprise filaments having a diameter of less than about 0.3 mm, less than about 0.2 mm, or less than about 0.15 mm.

A steel cord according to the present invention may be used in elevator belts, timing belts, or tire reinforcement applications.

In another embodiment in accordance with the present invention, a method of manufacturing a steel cord is provided comprising the steps of
- providing at least one steel element, said steel element being a filament or a strand,
- coating at least one of said steel elements with polymer,
- assembling said at least one element into a steel cord, characterized in that the polymer is a heat-curable one-component thermosetting material.

In a preferred embodiment according to the present invention, the step of coating may comprise dipping the at least one steel element in a polymer bath, stripping the superfluous polymer from the at least one steel element through a sizing die, and cooling the polymer, thereby controlling the coating layer thickness.

In a further embodiment in accordance with the present invention, a method is provided further comprising the step of curing the heat-curable one-component thermosetting material.

The method may further comprise the step of priming the filaments or strands with an adhesion promoter.

DESCRIPTION OF THE INVENTION

Figure 1:
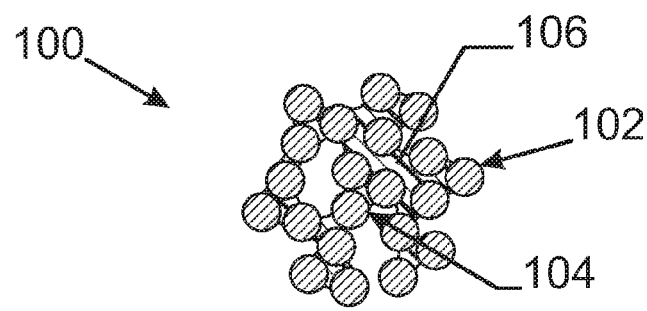
FIG. 1 shows an embodiment of a steel cord in accordance with the present invention.

A person skilled in the art will understand that the embodiments described below are merely illustrative in accordance with the present invention and not limiting the intended scope of the invention. Other embodiments may also be considered.

In a first embodiment according to the present invention, a steel cord is provided comprising one or more strands, said strands comprising at least two filaments, wherein the void spaces between at least two filaments of at least one of said one or more strands are at least partially filled with a composition comprising a thermosetting material, characterized in that the thermosetting material is a heat-curable one-component thermosetting material. As a consequence, at least two filaments of at least one of said one or more strands are at least partially connected to one another by means of a heat-curable one component thermosetting material.

In a second embodiment according to the present invention, a steel cord is provided comprising at least two strands, said strands comprising at least two filaments, wherein the void spaces between at least two strands are at least partially filled with a composition comprising a thermosetting material, characterized in that the thermosetting material is a heat-curable one-component thermosetting material. As a consequence, at least one filament of at least one strand is at least partially connected to at least one filament of at least one other strand by means of a heat-curable one component thermosetting material.

As used herein, a heat-curable one-component thermosetting material is a material wherein all components necessary are blended together prior to use and that is curable by a cross-linking process requiring addition of heat.

By using such heat-curable one-component thermosetting material, a steel cord in accordance with the present invention demonstrates improved adhesion, fatigue and elongation properties.

The steel cord in particular has the advantageous property that its structural elongation is lower compared to its non-elastomer filled counterpart. Structural elongation is caused by closing of the outer wires of a strand around its rope and closing of the outer strands of the steel rope around its rope under tension. The closing action is the filling up of the spaces between the individual wires and the spaces between the strands.

As a further advantage, the steel cord has the property that it shows less tension relaxation during use: due to dynamic action, the filaments in the cord rearrange leading to a drop in tension. Such a drop in tension is particularly problematic in applications where the cord is used under 'fixed length' configurations. Such a configuration occurs for example in a timing belt that is tensioned between toothed wheels, which after tensioning remain in a fixed position. Due to the tension relaxation, the belt will slacken during use, necessitating a retensioning of the belt, which leads to loss of uptime.

Further more, by using such heat-curable one-component thermosetting material, the point in time at which the curing of the elastomer occurs can be delayed at will. Consequently, the elastomer filled steel cord may be manipulated and used as an intermediate product for further assembly to a final product, during which the heat-curable one-component thermosetting material is subjected to a curing step.

In an embodiment according to the present invention, the heat-curable one-component thermosetting material may comprise polyurethane.

In a preferred embodiment in accordance with the invention, the heat-curable one-component thermosetting material may comprise blocked thermosetting material. As used herein blocked thermosetting material means a curable thermosetting material containing functional groups of which at least a sufficient amount has been reacted with a blocking agent to prevent the crosslinking reaction of these functional groups at room temperature with compounds that conventionally react with such groups, and which will permit that reaction to occur at higher (cure) temperatures. Such blocked thermosetting material may comprise blocked carboxyl, or preferably blocked isocyanate. A blocked isocyanate contains a sufficient amount of isocyanate having functional groups which have been reacted with a blocking agent preventing the crosslinking reaction of the functional group at room temperature. Upon addition of heat, deblocking and curing occurs, thereby forming polyurethane (PUR). An example of a commercially available heat-curable one-component thermosetting material comprising blocked isocyanate is Monothane™ as available from Dow Chemical Company.

In another embodiment, the heat-curable one-component thermosetting material may comprise polyurethane and blocked isocyanate.

The heat-curable one-component thermosetting material and the degree of penetration of this material between the steel elements of the steel cord, and the construction of the steel cord may be chosen in such a way that after curing the steel cord meets the required properties in an optimal way.

The elemental building block of a steel cord is a steel filament. Filaments generally have a round cross section, which is the preferred shape, although filaments can also be flattened or have a generally oval cross section.

A strand is an assembly of filaments that are twisted around each other. The twisting can be done in one single step, or it can be done in successive steps wherein filaments are additively twisted around an already existing strand or core filament.

Strands that are twisted around each other are called ropes. In this application a steel cord can designate a steel strand as well as a steel rope. Hence, a steel cord comprises at least one or more strands of steel filaments.

Intra-strand void spaces are void spaces in between the steel filaments of a strand of a steel cord. Inter-strand void spaces are void spaces in between the strands of one steel cord.

Steel cords may have a core, which is a filament or a strand centrally situated in the steel cord and which is not helically deformed. Around such core, at least one layer of additional steel elements is provided. The steel elements of the additional layer can either be steel filaments or steel strands, on their turn comprising steel filaments. If no core is present the steel elements are twisted around an imaginary axis in the middle of the core.

As a result of the build-up of a steel cord, void spaces are present between the steel filaments or strands of the cord. In the context of the present invention, void spaces are to be understood as all area of a radial cross-section of the cord, located inwards of the imaginary circle having as diameter the diameter of the cord, which area is not occupied by steel. Intra-strand void spaces are to be understood as void spaces in between the steel filaments of one steel cord. Inter-strand void spaces are void spaces in between the outer steel elements of at least two steel strands.

In FIGS. 1 to 9, the tens and the units digits of the reference numerals refer to like items over the different embodiments, while the hundreds digits refers to the number of the embodiment. Hence: X00 shows the steel cord of the embodiment "X", X02 indicates an outer strand of the steel cord of embodiment "X", X04 indicates a core strand of the steel cord of embodiment "X", and X06 indicates heat-curable one-component thermosetting material in embodiment "X."

Figure 2:
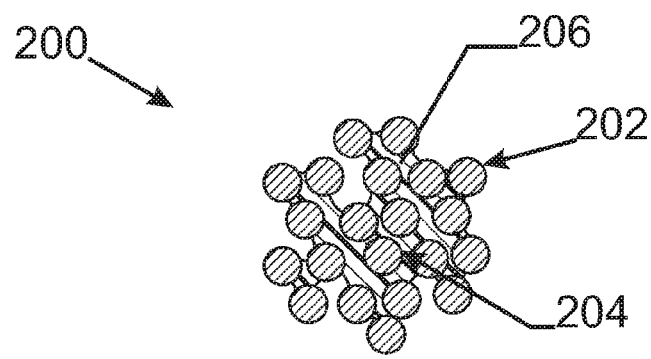
FIG. 2 shows an embodiment of a steel cord in accordance with the present invention.
Figure 3:
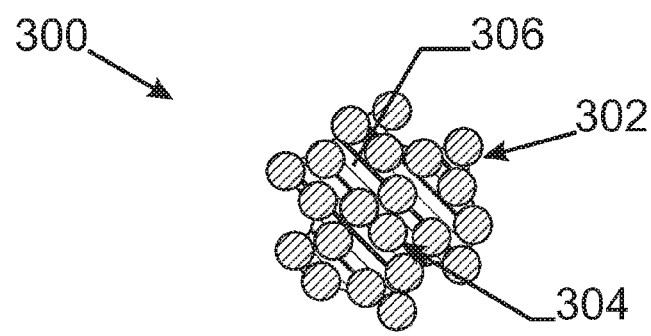
FIG. 3 shows an embodiment of a steel cord in accordance with the present invention.
Figure 4:
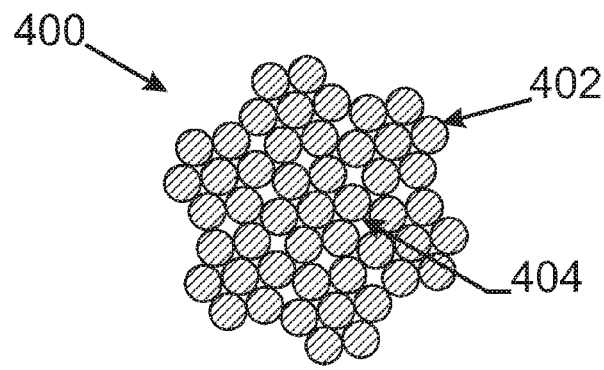
FIG. 4 shows an embodiment of an unfilled steel cord.

In an embodiment according to the present invention and as shown in FIGS. 1, 2 and 3, the steel cord (100, 200, 300) may comprise at least two strands (102, 104, 202, 204, 302, 304), wherein the inter-strand void spaces and/or intra-strand void spaces may be at least partially filled with a composition comprising a heat-curable one-component thermosetting material (106, 206, 306). By filling the intra-strand and/or inter-strand void spaces with the heat-curable one-component thermosetting material, relative displacements between any one filament or strand and another, in particular during curvature of the steel cord or steel cable under load, may be absorbed, thereby decreasing local wear and elongation and increasing the fatigue properties and the lifetime of the steel cord or steel cable.

Figure 5:
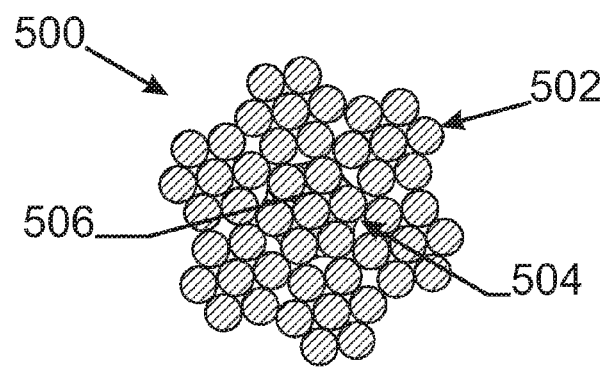
FIG. 5 shows an embodiment of a steel cord in accordance with the present invention.
Figure 6:
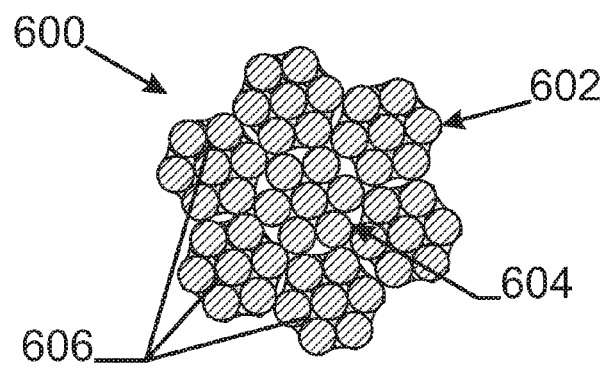
FIG. 6 shows an embodiment of a steel cord in accordance with the present invention.

In a further embodiment in accordance with the present invention, within at least one of the one or more strands of the steel cord all filaments may be at least partially connected to one another with heat-curable one-component thermosetting material. An example is illustrated in FIG. 5, showing a 7×7 steel cord (500) wherein only the intra-strand voids of the core strand (504) are filled with heat-curable one-component thermosetting material (506). Another example is illustrated in FIG. 6, showing a 7×7 steel cord (600) wherein only the intra-strand voids of the strands surrounding the core (602) strand are filled with heat-curable one-component thermosetting material (606).

Figure 9:
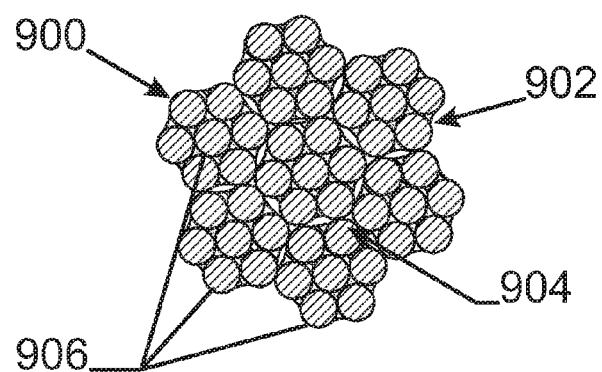
FIG. 9 shows an embodiment of a steel cord in accordance with the present invention.

In an alternative further embodiment in accordance with the present invention, in all strands all filaments within said strands may be at least partially connected to one another with heat-curable one-component thermosetting material. An example is illustrated in FIG. 9, showing a 7×7 steel cord (900) wherein the intra-strand voids of all strands (902, 904) are filled with heat-curable one-component thermosetting material (906).

In another alternative further embodiment in accordance with the present invention, at least one filament of at least two neighboring strands are at least partially connected to one another with heat-curable one-component thermosetting material, all filaments within each of the two neighboring strands optionally at least partially connected to each other with heat-curable one-component thermosetting material.

Figure 7:
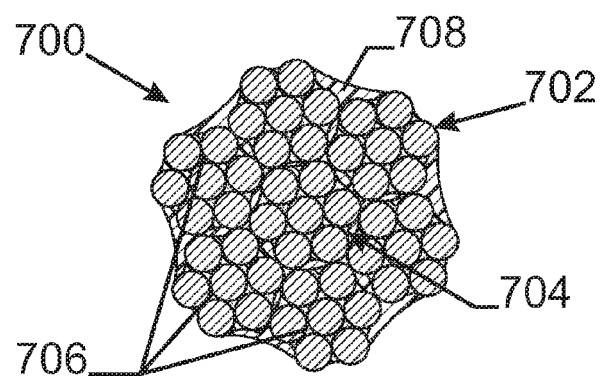
FIG. 7 shows a preferred embodiment of a steel cord in accordance with the present invention.
Figure 8:
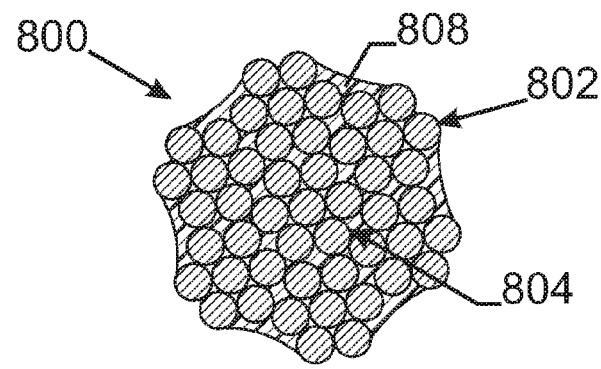
FIG. 8 shows another preferred embodiment of a steel cord in accordance with the present invention.

In another alternative further embodiment in accordance with the present invention, at least one filament of all neighboring strands are at least partially connected to one another with heat-curable one-component thermosetting material, the filaments within all neighboring strands optionally at least partially connected to each other with heat-curable one-component thermosetting material. An example is illustrated in FIG. 7 and FIG. 8, showing a 7×7 steel cord (700, 800) wherein both the intra-strand and inter-strand voids are filled with heat-curable one-component thermosetting material (706, 708, 808).

In an embodiment according to the invention, the intra-strand void spaces may be filled with a composition comprising heat-curable one-component thermosetting material for at least 40%, at least 60%, preferably at least 80%, or more preferably at least 90%.

In an embodiment according to the invention, the inter-strand void spaces may be filled with heat-curable one-component thermosetting material for at least 40%, at least 60%, preferably at least 80%, or more preferably at least 90%.

In a preferred embodiment according to the invention, both the intra-strand and inter-strand void spaces may be filled with a composition comprising heat-curable one-component thermosetting material for at least 40%, at least 60%, preferably at least 80%, or more preferably at least 90%.

In a further embodiment in accordance with the invention, a steel cord is provided, wherein at least part of the steel cord outer surface may be free from said heat-curable one-component thermosetting material. For use in dynamic applications, such as elevator belts, and in timing belts, it is desirable that no heat-curable one-component thermosetting material is present on the outer steel cord surface, for example in order to allow inspection of the ropes (in case of an elevator belt) or to allow ingress of an elastomer when producing the timing belt.

The filaments or strands of the steel cord may be primed with an adhesion promoter. Such promoter may be a primer selected from organo-functional silanes, organo-functional titanates and organo-functional zirconates which are known in the art for said purpose.

Various steel cord constructions may be used. Examples here are:

- multi-strand steel cords without a core e. g. of the m×n type, i.e. steel cords, comprising m strands with each n filaments, such as 4×7×0.10, 3×7×0.18 or 3×3×0.18; the last number is the diameter of the filament, expressed in mm;
- Multi-strand steel cords with a core strand of I metal filaments, and n strands of m metal filaments, surrounding the core strand. These steel cords are usually referred to as I+n×m type cords, such as 7×7, 19+9×7 or 19+8×7 cords;
- Compact steel cords e.g. of the 1×n type, i.e. steel cords comprising n steel filaments, n being greater than 8, twisted in only one direction with one single step to a compact cross-section, such as 1×9×0.18; the last number is the diameter of the filament, expressed in mm;
- Warrington strand steel cords which are compact cords wherein the filaments have different diameters in order to obtain a round outer appearance in stead of the polygonal outer cross section of a compact cord.
- layered steel cords e. g. of the I+m (+n) type, i.e. steel cords with a core of I filaments, surrounded by a layer of m filaments, and possibly also surrounded by another layer of n filaments, such as (3+9+15)×0.175 the last number is the diameter of the filament, expressed in mm.

The steel composition is preferably a plain carbon steel composition, i.e. it generally comprises a minimum carbon content of 0.40% (e. g. at least 0.60% or at least 0.80%, with a maximum of 1.1%), a manganese content ranging from 0.10 to 0.90% and a silicon content ranging from 0.10 to 0.90%; the sulfur and phosphorous contents are each preferably kept below 0.03%; additional micro-alloying elements such as chromium (up to 0.2 à 0.4%), boron, cobalt, nickel, vanadium . . . may be added to the composition; stainless steel compositions are, however, not excluded.

A cable comprising steel cord as explained in above embodiments may be used in elevator belts, timing belts, or tire reinforcement applications.

In another embodiment in accordance with the present invention, a method of manufacturing a steel cord is provided comprising the steps of providing at least one steel element, said steel element being a filament or a strand, coating at least one of said steel elements with polymer, assembling said at least one element into a steel cord, characterized in that the polymer is a heat-curable one-component thermosetting material. By coating the steel cord with a composition comprising a heat-curable one-component thermosetting material, this method is extremely simple compared to the expensive extrusion processes as described in the prior art.

In a method according to the present invention, the heat-curable one-component thermosetting material may comprise polyurethane. Such polyurethane may be a one-component polyurethane obtained by blending prior to use the components of a two-component polyurethane system with a very low almost unnoticeable reaction speed at coating temperature, such that acceleration of curing may be done at will by addition of heat.

In a method in accordance with the present invention, the polymer may comprise a heat-curable one-component blocked thermosetting material, preferably a blocked isocyanate.

In a method according to the present invention, the heat-curable one-component thermosetting material may comprise polyurethane and blocked isocyanate.

In a preferred embodiment according to the present invention, the step of coating may comprise dipping the at least one steel element in a polymer bath, stripping the superfluous polymer from the at least one steel element through a sizing die, and cooling the polymer, thereby controlling the coating layer thickness. By controlling the coating layer thickness, the degree in which the intra-strand and/or inter-strand void spaces of the steel cord are filled may be controlled, such that after assembling the steel cord at least part of the steel cord outer surface may be kept free from said heat-curable one-component thermosetting material. Before dipping the steel element it may be preheated to improve wetting by the polymer.

In an embodiment, the method may comprise additional steps of coating and assembling. For example a number of strands may be coated, assembled in a steel cord, and coated again, resulting in a steel cord as shown in FIG. 8.

In an embodiment in accordance with the present invention, the method may further comprise the step of curing the heat-curable one-component thermosetting material. The point in time at which the curing of the heat-curable one-component thermosetting material occurs can be delayed at will. Consequently, the method allows to manipulate the coated steel cord and to use it as an intermediate product for further assembly to a final product, during which the heat-curable one-component thermosetting material is subjected to a curing step. Curing may be done by applying induction, IR irradiation, or conventional heating.

Further, when using a heat-curable one-component thermosetting material, the method may still be used on fine steel cords with diameters below 0.30 mm.

A method according to the present invention may further comprise the step of priming the filaments or strands with an adhesion promoter. Such promoter may be a primer selected from organo functional silanes, organo functional titanates and organo functional zirconates which are known in the art for said purpose.

The steps of coating the steel cord with a composition comprising a heat-curable one-component thermosetting material and curing the heat-curable one-component thermosetting material may be applied in-line with the steel core or steel cable production.

EXAMPLE

Before application, the core strand is preheated to allow good wetting of the strand with Monothane™. The Monothane™ is thermostatically heated at 70° C. such that its viscosity drops. The strand is passed through the bath which is sealed with two dies. The last die determines the amount of Monothane™ applied. Before entering the assembly step, the Monothane™ is cooled down to 25° C., thereby increasing viscosity to form a solid paste. After assembly, the steel core is heated to about 135° C. upon which the isocyanate in the Monothane™ is deblocked and is able to crosslink to form the final polyurethane elastomer.

Figure 10:
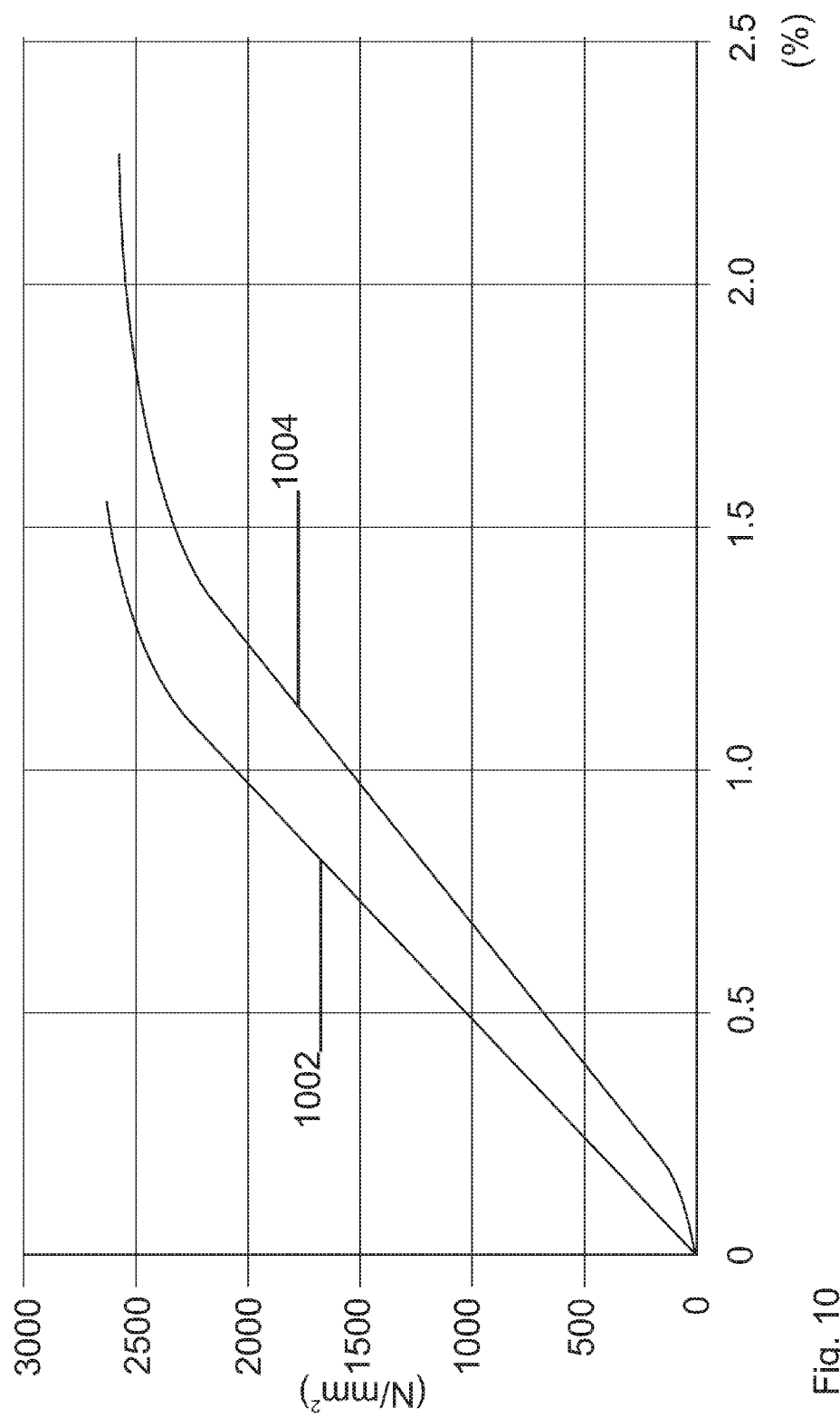
FIG. 10 shows a stress strain curve illustrating the present invention.

Even a small amount of polyurethane between the filaments prevents the filaments from shifting, resulting in an improved stress-strain ratio and lower structural elongation, as illustrated in FIG. 10 wherein a filled steel cord (1002) is compared to an unfilled steel cord (1004).

Further, at a tension of 67N, the steel cord filled with only a small amount of Monothane™ shows an improvement of 7% in tension relaxation compared to a not-filled cord.

An alternative product is Adiprene®K TE 92 as obtainable from Chemtura.

The invention claimed is:

1. A steel cord comprising:
    one or more strands, said one or more strands comprising at least two filaments,
    wherein void spaces between at least two filaments of at least one of said one or more strands are partially filled with a composition comprising a heat-curable one-component thermosetting material.

2. A steel cord comprising:
    a plurality of strands, said strands comprising at least two filaments,
    wherein void spaces between at least two of the strands are partially filled with a composition comprising a heat-curable one-component thermosetting material.

3. A steel cord according to claim 1, wherein the heat-curable one-component thermosetting material comprises polyurethane.

4. A steel cord according to claim 1, wherein the heat-curable one-component thermosetting material comprises blocked isocyanate.

5. A steel cord according to claim 1, comprising at least two strands, wherein the void spaces are at least one type of void spaces selected from the group consisting of inter-strand void spaces and intra-strand void spaces.

6. A steel cord according to claim 5, wherein the intra-strand void spaces are at least 80% filled with the composition comprising a heat-curable one-component thermosetting material.

7. A steel cord according to claim 5, wherein the inter-strand void spaces are at least 80% filled with the composition comprising a heat-curable one-component thermosetting material.

8. A steel cord according to claim 1, wherein the filaments or strands are primed with at least one adhesion promoter selected from the group consisting of organo-functional silanes, organo-functional titanates and organo-functional zirconates.

9. A steel cord according to claim 1, wherein the heat-curable one-component thermosetting material is cured.

10. A steel cord according to claim 1, comprising filaments having a diameter of less than about 0.3 mm.

11. A method comprising using the steel cord according to claim 1 in an elevator belt, a timing belt, or a tire reinforcement application.

12. A method of manufacturing a steel cord comprising the steps of:
    providing at least one steel element, said steel element being a filament or a strand comprising filaments,
    coating at least one of said steel elements with polymer, said coating step comprising dipping the at least one steel element in a polymer bath, stripping superfluous polymer from the at least one steel element through a sizing die and cooling the polymer, thereby controlling the coating thickness, and
    assembling said at least one steel element into a steel cord, wherein the polymer is a heat-curable one-component thermosetting material, and
    wherein at least part of an outer surface of the steel cord is kept free from said heat-curable one-component thermosetting material.

13. A method according to claim 12, wherein the heat-curable one-component thermosetting material comprises polyurethane.

14. A method according to claim 12, wherein the heat-curable one-component thermosetting material comprises blocked isocyanate.

15. A method according to claim 12, further comprising the step of curing the heat-curable one-component thermosetting material.

16. A method according to claim 12, further comprising the step of priming the filament or strand with at least one adhesion promoter selected from the group consisting of organo-functional silanes, organo-functional titanates and organo-functional zirconates.

17. A steel cord according to claim 2, wherein the heat-curable one-component thermosetting material comprises polyurethane.

18. A steel cord according to claim 2, wherein the heat-curable one-component thermosetting material comprises blocked isocyanate.

19. A steel cord according to claim 2, wherein intra-strand void spaces are also partially filled with the composition comprising a heat-curable one-component thermosetting material.

20. A steel cord according to claim 19, wherein the intra-strand void spaces are at least 80% filled with the composition comprising a heat-curable one-component thermosetting material.

21. A steel cord according to claim 2, wherein the void spaces between the at least two of the strands are at least 80% filled with the composition comprising a heat-curable one-component thermosetting material.

22. A steel cord according to claim 2, wherein the filaments or strands are primed with at least one adhesion promoter selected from the group consisting of organo-functional silanes, organo-functional titanates and organo-functional zirconates.

23. A steel cord according to claim 2, wherein the heat-curable one-component thermosetting material is cured.

24. A steel cord according to claim 2, comprising filaments having a diameter of less than about 0.3 mm.

25. A method comprising using the steel cord according to claim 2 in an elevator belt, a timing belt, or a tire reinforcement application.

26. A steel cord comprising one or more strands, said one or more strands comprising at least two filaments, wherein at least two filaments of at least one of said one or more strands are partially connected to one another via a heat-curable one-component thermosetting material.

27. A steel cord comprising at least two strands, said strands comprising at least two filaments, wherein at least one filament of at least one strand is partially connected to at least one filament of at least one other strand via a heat-curable one-component thermosetting material.

* * * * *